Jan. 5, 1954 G. L. ROARK 2,665,166
CAR SIDE SUN VISOR
Filed Aug. 20, 1951
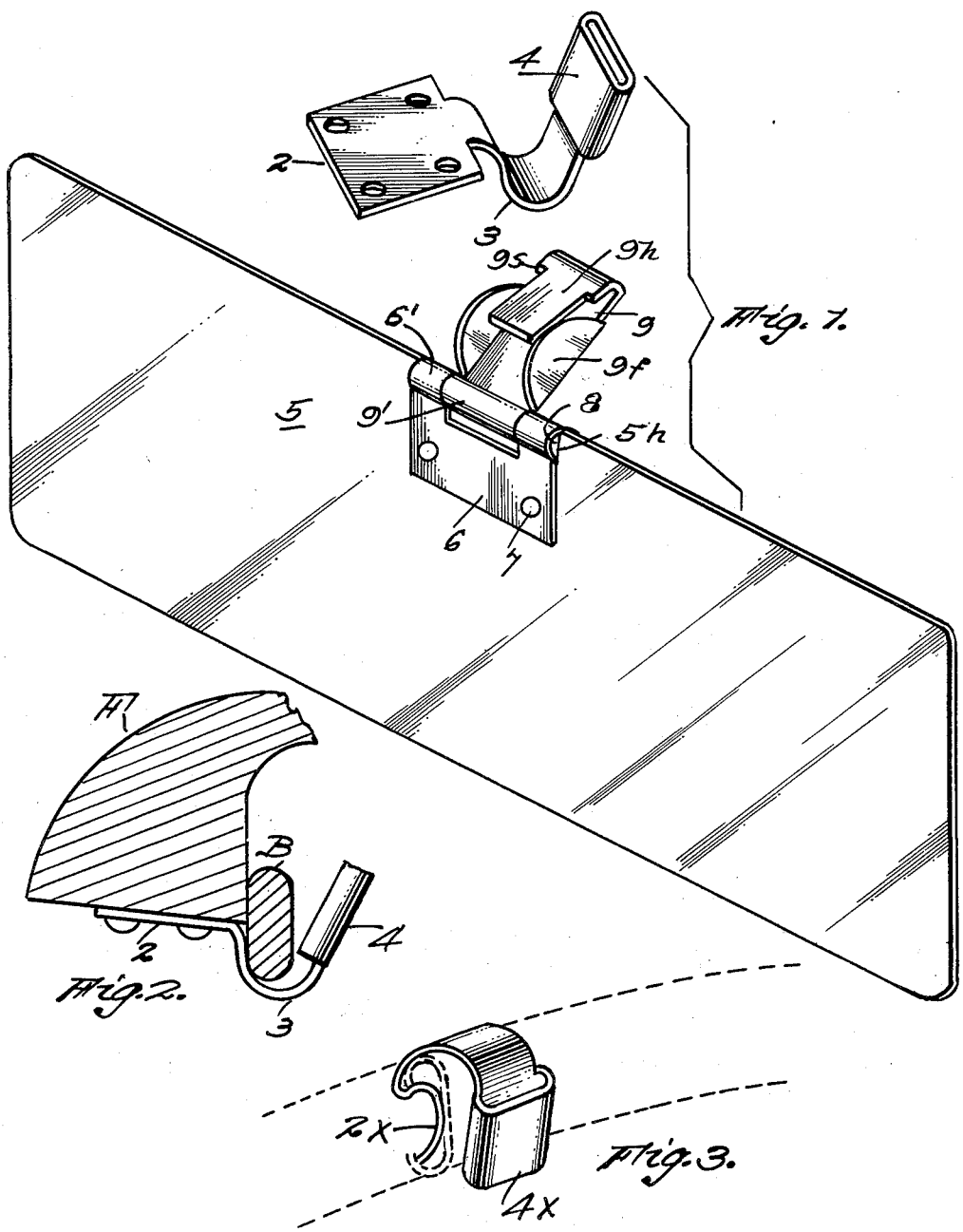
Inventor,
Glenn L. Roark;
By Frederick E. Maynard
Attorney.

Patented Jan. 5, 1954

2,665,166

UNITED STATES PATENT OFFICE 2,665,166

CAR SIDE SUN VISOR

Glenn L. Roark, Los Angeles, Calif.

Application August 20, 1951, Serial No. 242,710

1 Claim. (Cl. 296—97)

This invention is an adjustable sun visor for side door or window frames of vehicles, more particularly automobiles.

A purpose of the invention is to provide a combined bracket, fixedly attachable to a frame part, and a visor having a hingedly attached hook whereby to readily attach the visor to the installed bracket. A further intent of the invention is to provide a simple, practical, substantial, low cost and easily installed visor assembly, and to provide, especially, a fool-proof visor.

And an objective of the invention is to provide a visor assembly in which the visor member may be readily hooked onto the bracket or quickly and easily removed if and when so desired, and further to provide for a swinging adjustment of the applied visor to desired shielding positions as may be needed from time to time during use of the vehicle.

The invention resides in certain advancements in this art as set forth in the ensuing disclosure and having, with the above, additional objects and advantages as hereinafter developed, and whose constructions, combinations and details of means and manner of operation will be made manifest in the following description of the herewith illustrative embodiment; it being understood that modifications, variations, adaptations and equivalents may be resorted to within the scope, spirit and principles of the invention as it is claimed in conclusion hereof.

Figure 1 is a perspective showing the (separated) visor and bracket features. Figure 2 is a sectional detail of the installed frame bracket. Figure 3 is a perspective of a form adapted to clip onto a window frame of a vehicle.

As here incorporated the assembly includes a stiff bracket having a flat plate 2 to be readily affixed as by screws to the under face of a door or other frame part F of a vehicle. From one side of the plate extends a down-bent clearance bow 3 to pass under and upward inwardly from the usual frame bead B. The upper end of the bow (or shank) is provided with an integral, flattened socket 4 open at its top end.

A stiff, colored, sheet visor 5 is inwardly notched in its top edge at 5n to receive tubular bearing hubs 6 of a two-leaf clamp 6 which straddles the adjacent portion of the visor and is rigidly fixed thereto as by rivets 7. In the hubs is rigidly fixed a spindle 8 and this is embraced in a snug, frictional manner by a complementary sleeve 9' forming a part of a radial wing 9 of stiff sheet metal and having at its opposite sides upturned, parallel finger-grip lugs 9f. The outer end of the wing has an integral, stiff, over-turned hook 9h which is complementary to the socket 4. Small stop shoulders 9s of the hook engage and rest on the top edge of the hook socket to effect proper positioning of the visor supporting hook.

The hinge connection 8 enables the mounted visor to be swung from an upper, out-of-the-way position at the head frame F down to a more or less vertical, useful position below the header F to cut out light glare from the eyes of the car driver or a passenger, as the case may be, according to the locale of installation of the assembly in a given car.

The assembly of Fig. 3 is adapted for attachment to a rear, side window frame. The bracket has a socket 4x whose shank is bent at one end to form a resilient bow 2x which can be securely hooked into a C-section frame part.

What is claimed is:

A car-side, sun visor including an integral bracket having a plate attachable to a header face of a vehicle door frame and having a downwardly bent bow with an oblique, upwardly and inwardly projecting flat tubular socket opening upwardly as to the bow (in applied position), and a visor hanger including a pivoted wing having an overlapped and spaced hook directed downwardly of the top face of the wing and which is adapted to be slipped downwardly into the top open end of said socket, and a visor member having coaxial bearings including a pivot substantially aligned with the top edge of said member and on which the wing is mounted.

GLENN L. ROARK.

References Cited in the file of this patent

UNITED STATES PATENTS

| Number | Name | Date |
|---|---|---|
| 1,552,199 | Beckman | Sept. 1, 1925 |
| 1,757,280 | Withrau | May 6, 1930 |
| 1,792,615 | Summerhayes, Jr. | Feb. 17, 1931 |
| 1,933,333 | Morgan | Oct. 31, 1933 |
| 1,995,656 | Stout | Mar. 26, 1935 |
| 2,231,641 | Schwab | Feb. 11, 1941 |